(12) United States Patent
Berman et al.

(10) Patent No.: US 10,127,165 B2
(45) Date of Patent: Nov. 13, 2018

(54) MEMORY SYSTEM ARCHITECTURE INCLUDING SEMI-NETWORK TOPOLOGY WITH SHARED OUTPUT CHANNELS

(71) Applicant: Samsung Electronics Co., Ltd., Suwon-si, Gyeonggi-do (KR)

(72) Inventors: Amit Berman, Ramat Gan (IL); Uri Beitler, Ramat Gan (IL); Jun Jin Kong, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 552 days.

(21) Appl. No.: 14/801,241

(22) Filed: Jul. 16, 2015

(65) Prior Publication Data

US 2017/0017590 A1   Jan. 19, 2017

(51) Int. Cl.
*G06F 13/28* (2006.01)
*G06F 3/06* (2006.01)

(52) U.S. Cl.
CPC ............ *G06F 13/28* (2013.01); *G06F 3/0613* (2013.01); *G06F 3/0647* (2013.01); *G06F 3/0688* (2013.01)

(58) Field of Classification Search
None
See application file for complete search history.

(56) References Cited

U.S. PATENT DOCUMENTS

| 8,341,374 | B2 | 12/2012 | Kwon et al. | |
|---|---|---|---|---|
| 8,495,332 | B2 | 7/2013 | Wakrat et al. | |
| 8,578,085 | B2 | 11/2013 | Nasiby et al. | |
| 2009/0083476 | A1 | 3/2009 | Pua et al. | |
| 2010/0199025 | A1 | 8/2010 | Nanjou et al. | |
| 2011/0264851 | A1* | 10/2011 | Jeon .................... | G06F 13/1689 711/103 |
| 2013/0191581 | A1 | 7/2013 | Chen | |
| 2013/0304967 | A1 | 11/2013 | Hanafusa | |
| 2013/0336067 | A1 | 12/2013 | Tanaka et al. | |
| 2014/0082263 | A1 | 3/2014 | Iwasa et al. | |
| 2014/0133241 | A1 | 5/2014 | Shim et al. | |
| 2015/0261698 | A1* | 9/2015 | Zhang ................ | G06F 13/1621 711/156 |

* cited by examiner

*Primary Examiner* — Idriss N Alrobaye
*Assistant Examiner* — Dayton Lewis-Taylor
(74) *Attorney, Agent, or Firm* — Harness, Dickey & Pierce, P.L.C.

(57) ABSTRACT

A memory system includes a first plurality of nonvolatile memory devices of a first channel of the memory system, the first plurality of memory devices each being connected to a first communications bus; a second plurality of nonvolatile memory devices of a second channel of the memory system, the second plurality of memory devices each being connected to a second communications bus, and a first interconnection between a first memory device and a second memory device, the first memory device being a memory device from among the first plurality of nonvolatile memory devices, the second memory device being a memory device from among the second plurality of nonvolatile memory devices.

17 Claims, 10 Drawing Sheets

300

MEMORY SYSTEM ARCHITECTURE INCLUDING SEMI-NETWORK TOPOLOGY WITH SHARED OUTPUT CHANNELS

BACKGROUND

1. Field

One or more example embodiments of the inventive concepts relate to methods and apparatuses for facilitating the transmission of data between elements of a memory system.

2. Related Art

A nonvolatile memory, including for example a NAND flash memory, may store large amounts of information in a small chip area. For example, a NAND flash memory may store large amounts of information in a small chip area by using NAND cell units where a plurality of memory cells are connected in series to each other.

A solid state drive (SSD) architecture may include a controller connected to multiple channels and ways of NAND flash memory.

SUMMARY

Provided are methods and apparatuses for allowing data to be routed to a memory device of a multi-channel memory system via a data bus of a channel other than the channel to which the memory device is assigned.

According to at least one example embodiment, a memory system includes a first plurality of nonvolatile memory devices of a first channel of the memory system, the first plurality of memory devices each being connected to a first communications bus; a second plurality of nonvolatile memory devices of a second channel of the memory system, the second plurality of memory devices each being connected to a second communications bus; and a first interconnection between a first memory device and a second memory device, the first memory device being a memory device from among the first plurality of nonvolatile memory devices, the second memory device being a memory device from among the second plurality of nonvolatile memory devices.

The first memory device may be configured to, receive, from a controller, a first read request that requests first read data, and to select, based on path information included in the first read request, between, outputting the first read data to the first communications bus, and outputting the first read data to the first interconnection.

The first memory device may include a control logic; a memory cell array; a page buffer; and a demultiplexer, the demultiplexer being configured to, receive data from the page buffer, receive data from the first interconnection, and to select, based on a control signal received from the control logic, between, outputting data to the second memory device through the first interconnection, and outputting data to the first communications bus.

The first memory device may include a lower input/output (I/O) pad through which the first memory device is connected to the first interconnection, and the second memory device may include an upper I/O pad through which the second memory device is connected to the first interconnection.

The first plurality of nonvolatile memory devices may include a first plurality of separate memory cell arrays, respectively, and the second plurality of nonvolatile memory devices may include a second plurality of separate memory cell arrays, respectively.

The first plurality of nonvolatile memory devices may include first channel input/output (I/O) pads, respectively, through which the first plurality of memory devices are connected to the first communications bus, and the second plurality of nonvolatile memory devices may include second channel input/output (I/O) pads, respectively, through which the second plurality of memory devices are connected to the second communications bus.

The first memory device may include a lower input/output I/O pad through which the first memory device is connected to the first interconnection, and the second memory device may include an upper I/O pad through which the first memory device is connected to the first interconnection.

The first plurality of nonvolatile memory devices may include a first plurality of separate memory cell arrays, respectively, and the second plurality of nonvolatile memory devices may include a second plurality of separate memory cell arrays, respectively.

The memory system may further include a third plurality of nonvolatile memory devices of a third channel, the third plurality of memory devices each being connected to a third communications bus; and a second interconnection between the first memory device and a third memory device, the third memory device being a memory device from among the third plurality of nonvolatile memory devices.

The first memory device may be configured to, receive, from a controller, a first read request that requests first read data, and to select, based on path information included in the first read request, between, outputting the first read data to the first communications bus, outputting the first read data to the second memory device via the first interconnection, and outputting the first read data to the third memory device via the second interconnection.

The first memory device may include a control logic; a memory cell array; a page buffer; and a demultiplexer, the demultiplexer being configured to, receive data from the page buffer, receive data from the second memory device via the first interconnection, receive data from the third memory device via the second interconnection, and to select, based on a control signal received from the control logic, between outputting data to the first communications bus, outputting data to the second memory device via the first interconnection, and outputting data to the third memory device via the second interconnection.

The first memory device may include a lower input/output (I/O) pad through which the first memory device is connected to the first interconnection, the second memory device includes an upper I/O pad through which the second memory device is connected to the first interconnection, the first memory device includes an upper I/O pad through which the first memory device is connected to the second interconnection, and the third memory device includes a lower I/O pad through which the third memory device is connected to the second interconnection.

According to at least one example embodiment of the inventive concepts, a memory system including a plurality of channels may include a controller; and a plurality of nonvolatile memory devices, each of the plurality of nonvolatile memory devices being assigned to one of the plurality of channels, the plurality of channels corresponding, respectively, to a plurality of communications buses such that, for each of one the plurality of channels, nonvolatile memory devices assigned to the channel, from among the plurality of nonvolatile memory devices, are connected to the controller via the communications bus corresponding to the memory channel, the controller being configured to generate a read request requesting first data from a first memory device such that the read request includes path information instructing the first memory device to output the first data to a second memory device, the first memory device and the second memory device being ones of the plurality of nonvolatile memory devices, the first memory device and the second memory device being assigned to different channels respectively, from among the plurality of channels.

The memory system may further include a first interconnection between a first memory device and the second memory device.

The memory system may further include the first memory device includes a lower input/output (I/O) pad through which the first memory device is connected to the first interconnection, and the second memory device includes an upper I/O pad through which the second memory device is connected to the first interconnection.

The first memory device may be configured to, receive the read request, and output the first data to the second device through the first interconnection, in response to the path information.

The first memory device may include a control logic; a memory cell array; a page buffer; and a demultiplexer, the demultiplexer being configured to, receive data from the page buffer, receive data from the first interconnection, and to select, based on a control signal received from the control logic, between, outputting data to the second memory device through the first interconnection, and outputting data to the controller through a first communications bus, the first communications bus being the communication buses, from among the plurality of communications bus, corresponding to the channel, from among the plurality of channels, to which the first memory device is assigned.

The memory system may further include a second interconnection between the first memory device and a third memory device, the third memory device being one of the plurality of nonvolatile memory devices, the first, second and third memory devices being assigned, respectively, to different channels from among the plurality of channels.

The first memory device may include a control logic; a memory cell array; a page buffer; and a demultiplexer, the demultiplexer being configured to, receive data from the page buffer, receive data from the first interconnection, receive data from the second interconnection, and to select, based on a control signal received from the control logic, between, outputting data to the second memory device through the first interconnection, outputting data to the third memory device through the second interconnection, and outputting data to the controller through a first communications bus, the first communications bus being the communication bus, from among the plurality of communications buses, corresponding to the channel, from among the plurality of channels, to which the first memory device is assigned.

The first memory device may include a lower input/output (I/O) pad through which the first memory device is connected to the first interconnection, the second memory device may include an upper I/O pad through which the second memory device is connected to the first interconnection, the first memory device may include an upper I/O pad through which the first memory device is connected to the second interconnection, and the third memory device may include a lower I/O pad through which the third memory device is connected to the second interconnection.

BRIEF DESCRIPTION OF THE DRAWINGS

Example embodiments of inventive concepts will be more clearly understood from the following detailed description taken in conjunction with the accompanying drawings in which.

DETAILED DESCRIPTION OF EXAMPLE EMBODIMENTS

Figure 1:
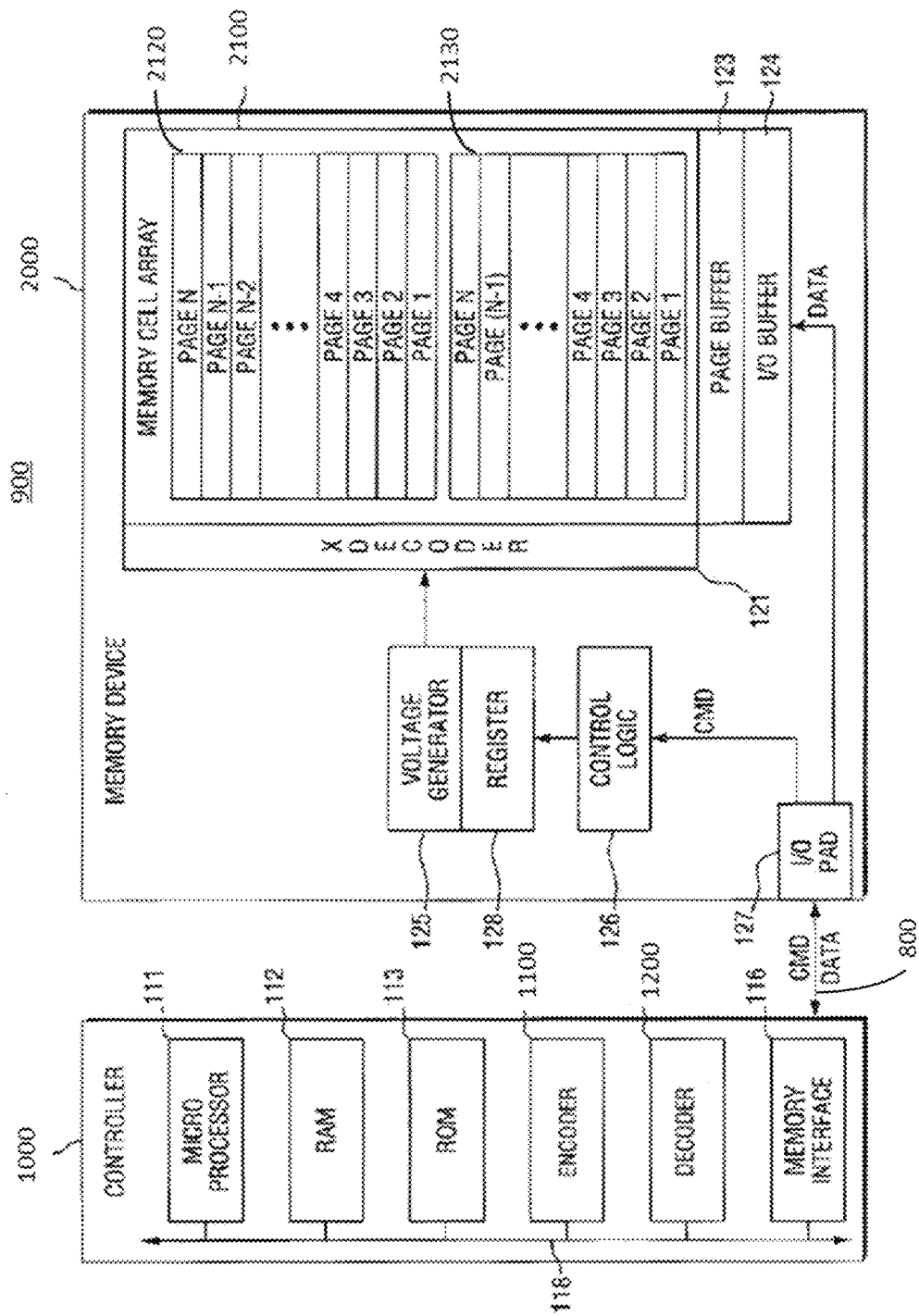
FIG. 1 is a diagram showing a memory system according to at least one example embodiment of the inventive concepts.

Example embodiments will now be described more fully with reference to the accompanying drawings. Many alternate forms may be embodied and example embodiments should not be construed as limited to example embodiments set forth herein. In the drawings, like reference numerals refer to like elements.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., nonvolatile memories universal flash memories, universal flash memory controllers, nonvolatile memories and memory controllers, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying step(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

A code segment may represent a procedure, function, subprogram, program, routine, subroutine, module, software package, class, or any combination of steps, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a block diagram of a memory system to which a memory according to some embodiments of the present inventive concept is applied. Referring to FIG. 1, the memory system 900 includes the memory controller 1000 and a nonvolatile memory device 2000.

The nonvolatile memory device 2000 may be, but is not limited to, a flash memory device, a NAND flash memory device, a phase change RAM (PRAM), a ferroelectric RAM (FRAM), a magnetic RAM (MRAM), etc. The nonvolatile memory device 2000 may have a planar structure or a three-dimensional (3D) memory cell structure with a stack of memory cells. The nonvolatile memory device 2000 may be implemented, for example, as a memory chip (e.g., a NAND chip). Though, for the purpose of simplicity, only one nonvolatile memory device 2000 is illustrated in FIG. 1, memory system 900 may include several nonvolatile memory devices (e.g., memory chips) arranged in multiple ways and connected to the controller 1000 via multiple channels, as will be discussed in greater detail below with reference to FIGS. 2-4B.

The nonvolatile memory device 2000 may include a memory cell array 2100, an X decoder 121, a voltage generator 125, an I/O buffer 124, a page buffer 123, and a control logic 126 each of which may be implemented as one or more circuits. The memory device may also include an input/output (I/O) pad 127.

The memory cell array 2100 includes a plurality of word lines W/L and a plurality of bit lines B/L. Each memory cell may be implemented, for example, as a memory cell having a floating gate or a charge storage layer such as a charge trapping layer, or any other type of memory cell capable of storing one or more bits of data.

The memory cell array 2100 may include a plurality of blocks and a plurality of pages. One block includes a plurality of pages. A page may be a unit of program and read operations, and a block may be a unit of an erase operation. For example, the memory cell array 2100 includes a first block 2120 and a second block 2130. As is illustrated n FIG. 1, according to at least one example embodiment of the inventive concepts, the first block 2120 includes pages 1-N, and the second block 2130 includes pages 1-N, where N is a positive integer greater than 1.

The control logic 126 controls the overall operation of the nonvolatile memory device 2000. When receiving a command CMD from the memory controller 1000, the control logic 126 interprets the command CMD and controls the nonvolatile memory device 2000 to perform an operation (e.g., a program operation, a read operation, a read retry operation, or an erase operation) according to the interpreted command CMD.

According to at least one example embodiment, the control logic 126 may include a hardware-implemented processor configured to execute commands based on command signal CMD. According to at least one example embodiment of the inventive concepts, in addition to the processor, the control logic 126 may also include a storage unit for storing steps that, when executed by the processor included in the control logic 126, cause the processor to perform specific operations. According to at least one example embodiment of the inventive concepts, any operations described herein as being performed by the memory device 2000 may be performed by, or under the control of, the control logic 126, for example, by the processor included in the control logic 126 driving firmware stored in the storage unit included in the control logic 126. Alternatively, the control logic 126 may be a circuit (e.g. an application specific integrated circuit (ASIC) or field programmable gate array (FPGA)) that is physically programmed, in terms of hardware, to perform or control any operations described herein as being performed by the memory device 2000.

The X decoder 121 is controlled by the control logic 126 and drives at least one of the word lines W/L in the memory cell array 2100 according to a row address.

The voltage generator 125 is controlled by the control logic 126 to generate one or more voltages required for a program operation, a read operation or an erase operation and provide the generated voltages to one or more rows selected by the X decoder 121.

A register 128 is controlled by the control logic 126 and is a space in which information input from the memory controller 1000 is stored and may include a plurality of latches. For example, the register 128 may group read voltage (and/or reference voltage) information and store the information in the form of a table.

The page buffer 123 is controlled by the control logic 126 and operates as a sense amplifier or a write driver according to an operation mode (e.g., a read operation or a program operation).

The I/O pad 127 and the I/O buffer 124 may serve as I/O paths of data exchanged between an external device, e.g., the memory controller 1000 or a host and the nonvolatile memory device 2000. The I/O pad 127 is connected to the controller 1000 through a memory system bus 800. Data and or commands may be output from the memory device 2000 to the controller 1000 or received from the controller 1000 at the memory device 2000 via the I/O pad 127 and the memory system bus 800.

Returning to FIG. 1, the memory controller 1000 may include a microprocessor 111, a read-only memory (ROM) 113, a random access memory (RAM) 112, an encoder 1100, a decoder 1200, a memory interface 116, and a controller bus 118. The elements 111 through 116 of the memory controller 1000 may be electrically connected to each other through the controller bus 118.

The microprocessor 111 controls the overall operation of the memory system 900 including the memory controller 1000. The microprocessor 111 is a circuit that controls other elements by generating control signals. When power is supplied to the memory system 900, the microprocessor 111 drives firmware (e.g., stored in the ROM 113) for operating the memory system 900 on the RAM 112, thereby controlling the overall operation of the memory system 900. According to at least one example embodiment of the inventive concepts, the microprocessor 111 may also issue steps for controlling operations of other elements of the memory controller 1000 including, for example, some or all of the ROM 113, RAM 112, encoder 1100, decoder 1200, memory interface 116, and controller bus 118. According to at least one example embodiment of the inventive concepts, any operations described herein as being performed by the memory controller 1000 may be performed by, or under the control of, the microprocessor 111, for example, by the microprocessor driving the above-referenced firmware.

While a driving firmware code of the memory system 900 is stored in the ROM 113, one or more example embodiments of the inventive concepts are not limited thereto. The firmware code can also be stored in a portion of the nonvolatile memory system 900 other than the ROM 113. Therefore, the control or intervention of the microprocessor 111 may encompass not only the direct control of the microprocessor 111 but also the intervention of firmware which is software driven by the microprocessor 111.

Alternatively, the microprocessor 111 may be a circuit (e.g. an ASIC or FPGA) that is physically programmed, in terms of hardware, to perform or control any operations described herein as being performed by the memory controller 1000.

The RAM 112, which is a memory serving as a buffer, may store an initial command, data, and various variables input from a host or the microprocessor 111, or data output from the nonvolatile memory device 2000. The RAM 112 may store data and various parameters and variables input to and output from the nonvolatile memory device 2000. According to at least some example embodiments of the inventive concepts, the RAM 112 may store an instruction queue, which includes a list of pending memory device access instructions (e.g. data read requests and data write requests for the memory device 2000).

The memory interface 116 may serve as an interface between the memory controller 1000 and the nonvolatile memory device 2000. The memory interface 116 is connected to the I/O pad 127 of the nonvolatile memory device 2000 via the memory system buss 800 and may exchange data with the I/O pad 127 via the memory system bus 800. In addition, the memory interface 116 may create a command suitable for the nonvolatile memory device 2000 and provide the created command to the I/O pad 127 of the nonvolatile memory device 2000. The memory interface 116 provides a command to be executed by the nonvolatile memory device 2000 and an address ADD of the nonvolatile memory device 2000.

According to at least one example embodiment of the inventive concepts, the decoder 1200 may be an error correcting code (ECC) decoder, and the encoder 1100 may be an ECC encoder. According to at least one example embodiment of the inventive concepts, the decoder 1200 and the encoder 1100 perform error bit correction. The encoder 1100 may generate data added with one or more parity and/or redundancy bits by performing error correction encoding on data before the data is provided to the nonvolatile memory device 2000. The one or more parity and/or redundancy bits may be stored in the nonvolatile memory device 2000.

Each of the encoder 1100 and the decoder 1200 may include an error correction circuit, system or device.

Figure 2:
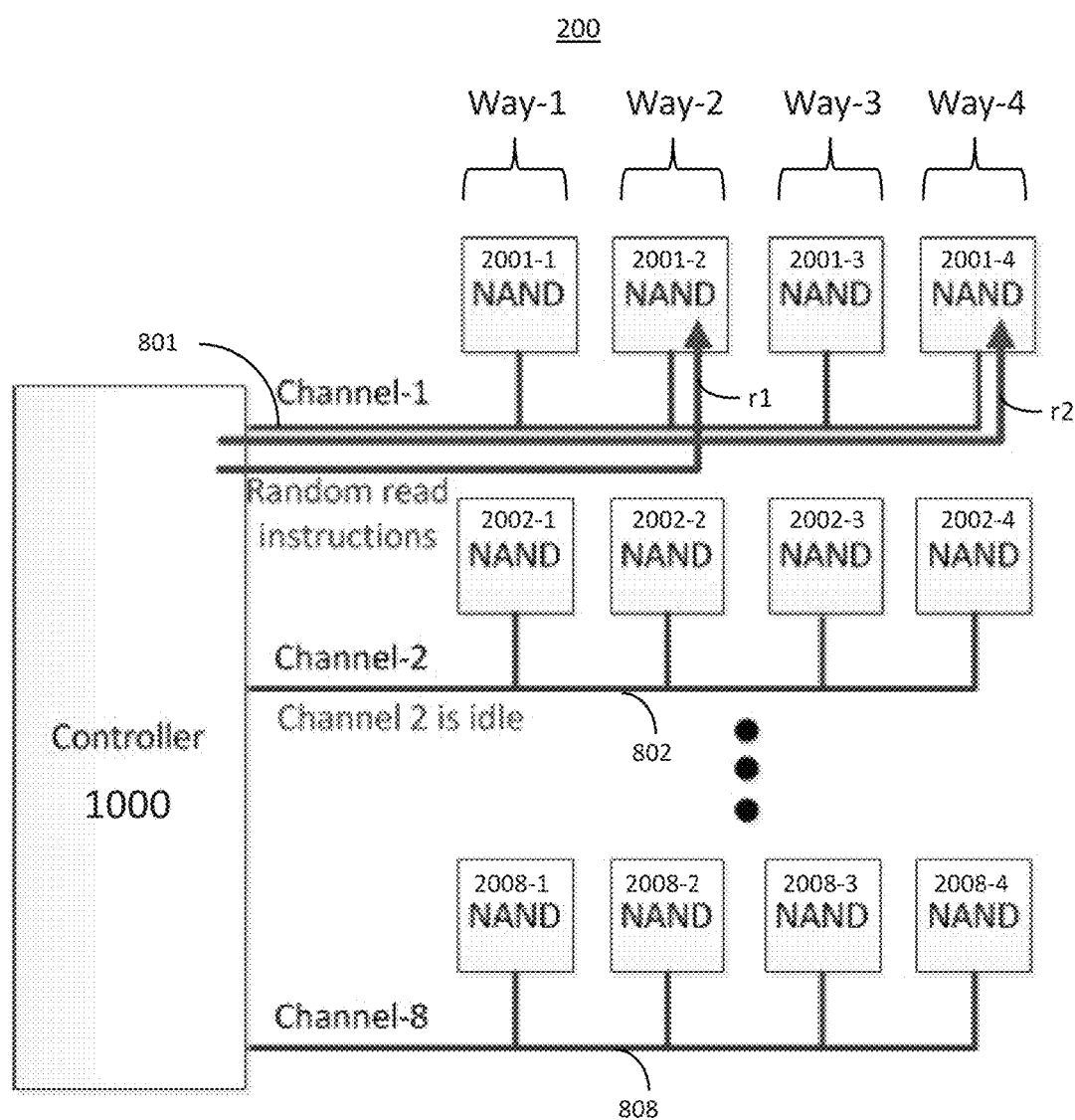
FIG. 2 is a diagram showing an example structure of the memory system of FIG. 1 according to at least one example embodiment of the inventive concepts.

FIG. 2 is a diagram showing an example structure of the memory system of FIG. 1 according to at least one example embodiment of the inventive concepts.

FIG. 2 illustrates a memory system 200. The memory system 200 is an example structure of the memory system 900 shown in FIG. 1. As is illustrated in FIG. 2, the controller 1000 is connected to a plurality of memory devices 2001-1~2008-4, which are each associated with one of 4 ways (Way-1 through Way-4) and one of 8 channels (Channel-1 through Channel-8). Accordingly, the memory system 200 illustrates an example of a memory system where the memory devices are arranged in 8 channels and 4 ways.

As is illustrated in FIG. 2, for each channel Channel-i, the controller is connected to the memory devices of the channel Channel-i (memory devices 200i-1 through 200i-4) through a communications bus 80i, where i is an index value and a positive integer. For example, as is illustrated in FIG. 2, the controller 1000 is connected to the memory devices 2001-1, 2001-2, 2001-3, and 2001-4 of channel Channel-1 through communications bus 801; the controller 1000 is connected to the memory devices 2002-1, 2002-2, 2002-3, and 2002-4 of channel Channel-2 through communications bus 802; and the controller 1000 is connected to the memory devices 2008-1, 2008-2, 2008-3, and 2008-4 of channel Channel-8 through communications bus 808. Though not illustrated for the purpose of simplicity, the memory controller 1000 is connected to memory devices of channels Channel-3 through Channel-7 in the same manner discussed above with respect to channels Channel-1, Channel-2, and Channel-8.

Each of the memory devices 2001-1~2008-4 may have the structure of the memory device 2000 illustrated in FIG. 1. Data and or commands may be output from the memory devices of channel Channel-i (i.e., memory devices 200i-1-200i-4) to the controller 1000 or received from the controller 1000 at the memory devices of channel Channel-i via the communications bus 80i.

The structure shown in FIG. 2 is an example of a bus topology, where several paths (i.e., channels) are connected to a managing controller (e.g., controller 1000). Each path is distributed to NAND flash components (ways), and each die can have separate planes. The structure shown in FIG. 2 may enable the parallelism of write requests and consequently effective read of sequential addresses by using super-page arrangement. However, the structure shown in FIG. 2 may have issues regarding scalability with respect to a random read operation, where two or more read instructions issued by the controller 1000 can be addresses the same channel while other channels are idle.

For example, generally, bus utilization (i.e., utilization of communications buses 801 through 808 of the memory system 200) depends on the ratio between the number of read instructions and channels. For example, for a typical solid state drive (SSD) structure including 8 channels and 8 ways, for an instruction queue including 8 read instructions, the initial 8 parallel reads may have average use of 5.25 channels out of the 8 total channels, for an instruction queue including 16 read instructions, the initial 8 parallel reads have average use of 7.05 channels out of the 8 total channels, and for an instruction queue including 32 read instructions, the initial 8 parallel reads have average use of 7.88 channels out of the 8 total channels. These channel utilization values indicate that as long as a size of a read queue is about double the size of channels the channel utilization may reach a desirable level, but as the size of the read queue is shortened (e.g. due to burst storage access) the latency of each read operation is increased due to the difficulties with transmitting data over a busy channel or, alternatively, the inability to transmit data over a busy channel.

For example, in the example illustrated in FIG. 2, according to at least some example embodiments of the inventive concepts, only one memory device of a given channel Channel-i at a time can send read data to the controller 1000 through the communications bus 80i. Thus, as is illustrated in FIG. 2, when the controller 1000 issues a first read instruction r1 addressed to memory device 2001-2 and, at the same time or shortly thereafter, issues a second read instruction r2 addressed to memory device 2001-4, it may be necessary for the memory device 2001-4 to wait, until the memory device 2001-2 finishes outputting data in response to the first read instruction r1, before the memory device 2001-4 can begin outputting data in response to the second read instruction r2. The waiting described above may be necessary due to memory device 2001-2 and memory device 2001-4 being connected to the controller 1000 through the same channel (Channel-1), and thus being configured to use the same communications bus (i.e., communications bus 801) to communicate with the controller 1000. In the example shown in FIG. 2, the memory device 2001-4 may have to wait in the manner described above even if one or more of channels Channel-2 through Channel-8 are idle. An idle channel refers to a channel that is not currently being used to transfer data in a data access operation (e.g., read or write), while a busy channel is a channel that is currently being used to transfer data in a data access operation.

Accordingly, it may be beneficial to employ a topology that increases utilization of otherwise idle channels. A semi-network topology according to at least some example embodiments of the inventive concepts will now be discussed in greater detail below with reference to FIGS. 3A-4B.

Figure 3A:
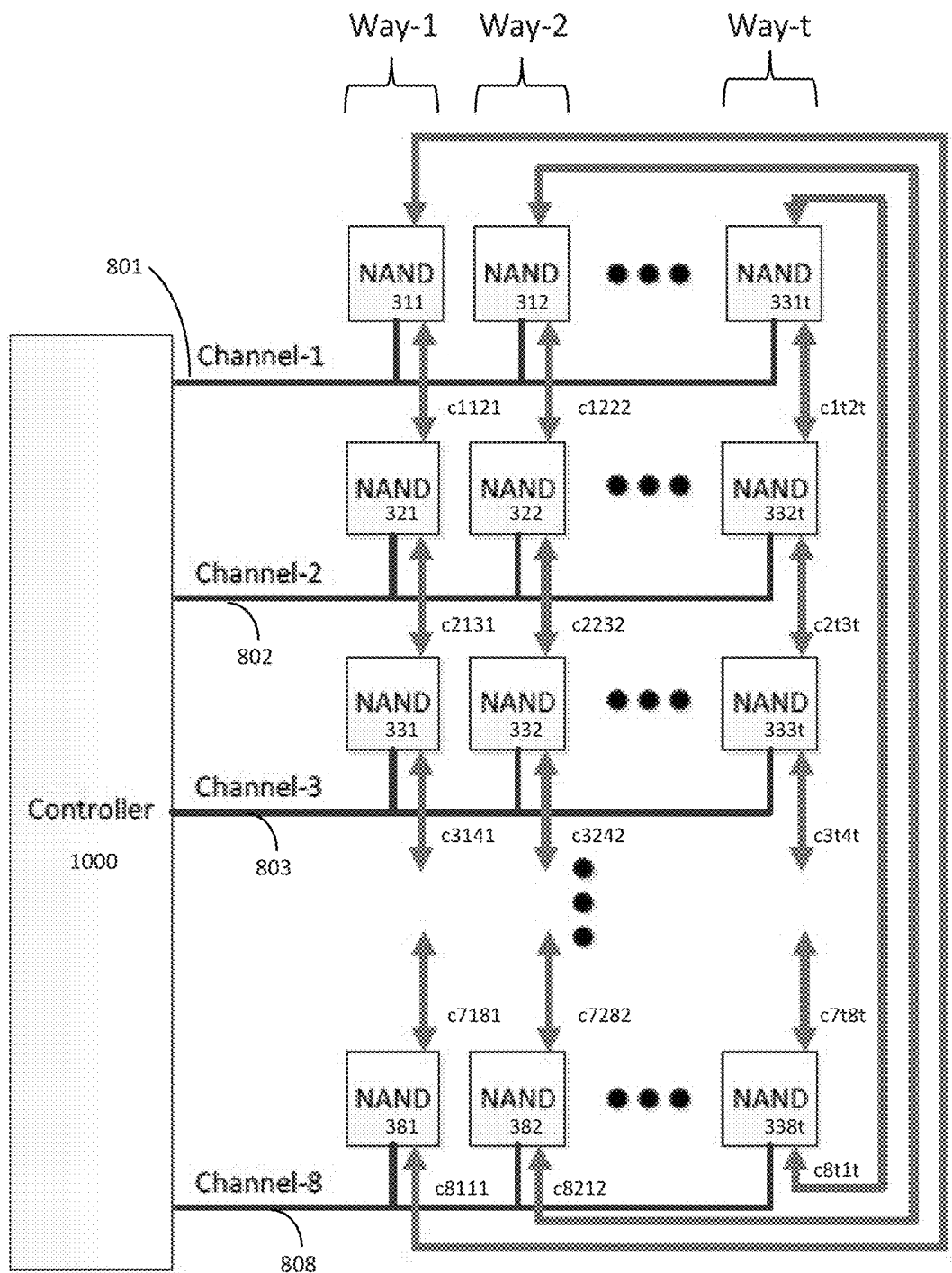
FIG. 3A is a diagram showing an example structure of the memory system of FIG. 1 employing a semi-network structure according to at least one example embodiment of the inventive concepts.

FIG. 3A is a diagram showing an example structure of the memory system of FIG. 1 employing a semi-network structure according to at least one example embodiment of the inventive concepts. FIG. 3A illustrates a memory system 300. Memory system 300 is an example implementation of the memory system 900 illustrated in FIG. 1.

As is illustrated in FIG. 3A, the controller 1000 is connected to a plurality of memory devices 311~38t, which are each associated with one of t ways (Way-1 through Way-t) and one of 8 channels (Channel-1 through Channel-8). The value t is a positive integer greater than 1. Accordingly, the memory system 200 illustrates an example of a memory system where the memory devices are arranged in 8 channels and t ways. Further, while FIG. 3A shows an example where a number of memory devices connected to each channel is the same (i.e., t), according to at least some example embodiments, numbers of memory devices of one or more channels may be different from each other.

As is illustrated in FIG. 3A, in the same manner discussed above with respect to the memory device 200 of FIG. 2, for each channel Channel-i, the controller 1000 is connected to the memory devices of the channel Channel-i (i.e., memory devices 3$i$1-3$it$) through a communications bus 80$i$. For example, as is illustrated in FIG. 2, the controller 1000 is connected to the memory devices 311-31$t$ of channel Channel-1 through communications bus 801; the controller 1000 is connected to the memory devices 321-32$t$ of channel Channel-2 through communications bus 802; the controller 1000 is connected to the memory devices 331-33$t$ of channel Channel-3 through communications bus 803; and the controller 1000 is connected to the memory devices 381-38$t$ of channel Channel-8 through communications bus 808. Though not illustrated for the purpose of simplicity, the memory controller 1000 is connected to memory devices of channels Channel-4 through Channel-7 in the same manner discussed above with respect to channels Channel-1, Channel-2, Channel-3 and Channel-8.

According to at least one example embodiment of the inventive concepts, the memory devices 311~38$t$ may be implemented as separate memory chips, respectively. According to at least one example embodiment, the memory system 300 may be included in, or embodied as, a solid state drive (SSD).

Data and or commands may be output from the memory devices of channel Channel-i (i.e., memory devices 3$i$1-3$it$) to the controller 1000 or received from the controller 1000 at the memory devices of channel Channel-i via the communications bus 80$i$.

Further, as is illustrated in FIG. 3A, each memory device may be directly connected to a memory device of a higher channel and a memory device of a lower channel. For example, in the example illustrated in FIG. 3A, a memory device of way Way-w and channel Channel-i is directly connected to both: (a) a memory device of way Way-w and channel Channel-(i−1), and (b) a memory device of way Way-w and channel Channel-(i+1). Like the value i, the value w is an index value and a positive integer.

As is shown in FIG. 3A, the memory devices of channel Channel-1 are directly connected to the memory devices of channel Channel-8 through. For example, as used herein with respect to channels of a memory system, the Channel-(i+1)=Channel-1 when i=n, and the Channel-(i−1)=Channel-n when i=1, where n is a positive integer greater than 1 and indicates a total number of channels in the memory system. For example, according to the example illustrated in FIG. 3A, n=8 in memory system 300.

As is illustrated in FIG. 3A, memory devices of the memory system 300 are connected via interconnections c1121-8$t$1$t$. As is illustrated in FIG. 3A, an interconnection represented as cXxYy (where values X, x, Y, y and index values and positive integers) connects a memory device 3X$x$ to a memory device 3Y$y$. As examples, interconnection c1121 connects memory device 311 to memory device 321, and interconnection c2232 connects memory device 322 to memory device 332, as is shown in FIG. 3A.

Each of interconnections c1121-8$t$1$t$ may be implemented by, for example, data transmission wires and/or data buses. As will be explained in greater detail with respect to FIG. 3B below, an interconnection cXxYy connects an I/O pad of a memory device 3X$x$ to an I/O pad of a memory device 3Y$y$, such that memory devices 3X$x$ and 3Y$y$ can send data to, and receive data from, one another.

Further, according to at least one example embodiment, when the controller 1000 generates a read request to initiate a data read operation with respect to one of the memory devices 311~38$t$, in addition to including an address identifying the requested data that is to be read during the read operation, the read request may also include path information indicating a path a memory device is to use for outputting the requested data. By setting the path information the controller 1000 may control which channel a memory device uses to output requested data.

For example, as is discussed above, the RAM 112 may store an instruction queue, which includes a list of pending memory device access instructions (e.g. data read requests and data write requests for memory device 2000). Based on information included in the instruction queue, the controller 1000 (e.g., the microprocessor 111) can determine when memory access requests (e.g., read requests) for multiple memory devices of the same channel exist in the instruction queue. For example, as will be discussed in greater detail below with reference to FIG. 3B, when the controller 1000 determines that read requests exist for more than one memory device of a single channel, the controller 1000 can generate path information for the memory access requests such that the memory devices receiving the memory access requests output data using different channels.

Figure 3B:
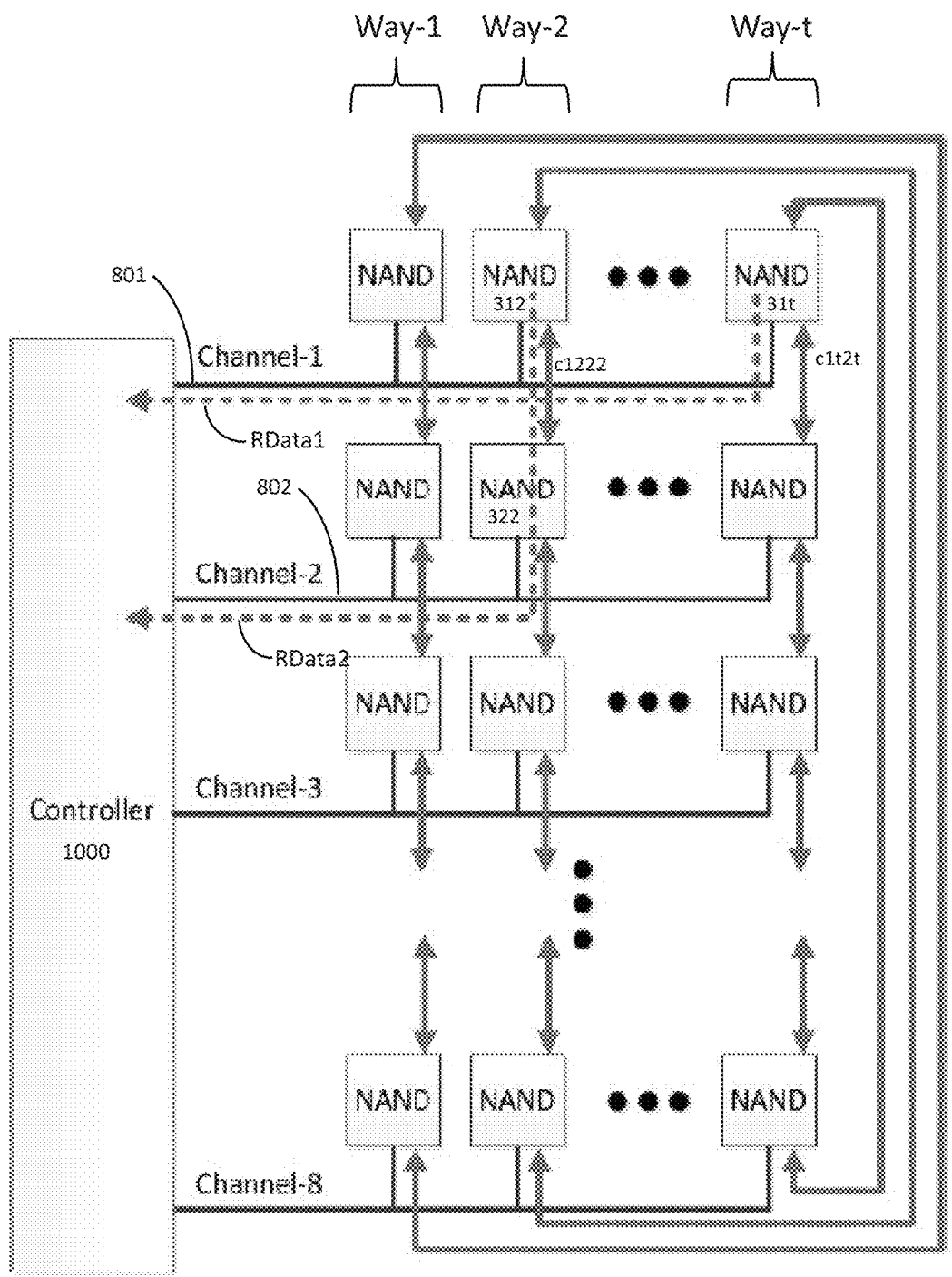
FIG. 3B is a diagram showing an example structure of a memory device of the memory system of FIG. 3A.

FIG. 3B illustrates an example of outputting read data using a semi-network structure according to at least one example embodiment of the inventive concepts.

According to at least some example embodiments of the inventive concepts, when the controller 1000 issues a first and second read request, RRequest1 and RRequest2, for data located in memory device 31$t$ and memory device 312, respectively, of channel Channel-1, the memory system 300 is capable of outputting first and second read data RData1 and RData2 from memory device 312 and memory device 31$t$, respectively, in parallel. For example, as is shown in FIG. 3B, the memory device 31$t$ may output the first read data RData1, which is the data requested in the first read request RRequest1, to the controller 1000 via the communications bus 801 while, in parallel, the memory device 312 outputs the second read data RData2, which is the data requested in the second read request RRequest2, to memory device 322 via the interconnection c1222. Further, in response to receiving the second read data RData2, the memory device 322 may output the second read data RData2 to the controller 1000 via the communications bus 802 in parallel with the output of the first read data RData1 via communications bus 801.

Accordingly, the memory system 300 employing the semi-network structure according to at least one example embodiment of the inventive concepts is capable of outputting requested read data read from two memory devices of the same channel (i.e., two memory devices connected to the controller 1000 via the same communications bus) in parallel. An example structure of each of memory devices 311~38$t$ will now be discussed in greater detail below with reference to FIG. 3C.

Figure 3C:
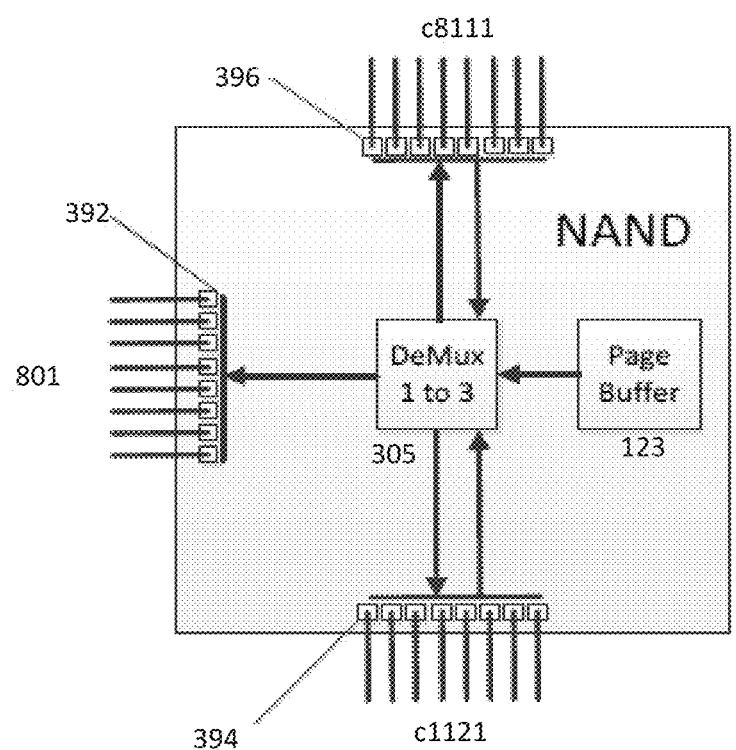
FIG. 3C illustrates an example of outputting read data using a semi-network structure according to at least one example embodiment of the inventive concepts.

FIG. 3C is a diagram showing an example structure of a memory device of the memory system of FIG. 3A.

The structure of memory device 311A will now be explained with reference to FIG. 3C. The memory device 311A is an example structure of the memory device 311 of channel Channel-1 and way Way-1 of the memory device 300.

Referring to FIG. 3C, though not fully illustrated for the purpose of simplicity, the memory device 311A may include the same structure as that shown in FIG. 1 and described above with respect to the memory device 2000, with the following exceptions. In addition to including a first I/O pad 392 connected to communications 801 (where the first I/O pad 392 which has a structure and connections corresponding to those described above with respect to the I/O pad 127 of memory device 2000), the memory device 311A also includes a lower I/O pad 394 and an upper I/O pad 396. Further, the memory device 311A also includes a demultiplexer (DeMux) 305. The DeMux 305 may be, for example, a 1-to-3 DeMux (i.e., the DeMux 305 provides one input at a time to one of three different outputs).

According to at least one example embodiment of the inventive concepts, the memory device 311A may be implemented as a memory chip.

As is illustrated in FIG. 3C, the DeMux 305 may be connected, through data communications paths (e.g. wires or other electrical connections), to first I/O pad 392, upper I/O pad 396, and lower I/O pad 394. According to at least one example embodiment of the inventive concepts, the DeMux 305 may also be connected to, and controlled by, the control logic 126 illustrated in FIG. 1.

According to at least one example embodiment, in response to a read request received from the controller 1000 (e.g., through the communications bus 801), the memory device 311A may retrieve the requested data (e.g., from the memory cell array 2100 illustrated in FIG. 1) and store the requested data in the page buffer 123. Further, as is discussed above, the read request received from the controller 1000 may include path information. For example, the path information may indicate which of three paths the memory device 311A is to use in order to output the requested data. For example, the path information may indicate whether the memory device 311A should output the requested data to: (i) the communication bus 801 via first I/O pad 392, (ii) the interconnection c1121 between memory device 311 and memory device 321 via lower I/O pad 394, or (iii) the interconnection c8111 between memory device 311 and memory device 381 via upper I/O pad 396.

While, for the purpose of simplicity, only an example structure of the memory device 311 is illustrated in FIG. 3C, all memory devices 312~38$t$ of the memory system 300 may have the same structure shown in FIG. 3C with respect to memory device 311, with the exception that the specific channels and interconnections to which memory devices 312~38$t$ are connected via first I/O pad 392, upper I/O pad 396, and lower I/O pad 394 are those shown in FIG. 3A.

For example, with respect to the example shown in FIG. 3B, the first read request RRequest1 sent from the controller 1000 to the memory device 31$t$ may include path information that controls the memory device 31$t$ to output the first read data RData1 to the communications bus 801 via the first I/O pad 392 of the memory device 31$t$. For example, the control logic 126 of the memory device 31$t$ may control the DeMux 305 of the memory device 31$t$ to select, as an output, the output connected to the first I/O pad 392 of the memory device 31$t$, based on the path information included in the first read request RRequest1. Thus, the DeMux 305 of the memory device 31$t$ may receive the first read data RData1 from the page buffer 123 of the memory device 31$t$ and output the first read data RData1 to the communications bus 801 via the first I/O pad 392 of the memory device 31$t$.

Further, the second read request RRequest2 sent from the controller 1000 to the memory device 312 may include path information that controls the memory device 312 to output the second read data RData2 to the memory device 322 via the lower I/O pad 394 of the memory device 312 and the interconnection c1222 connected in between the lower I/O pad 394 of the memory device 312 and the upper I/O pad 396 of the memory device 322. For example, the control logic 126 of the memory device 312 may control the DeMux 305 of the memory device 312 to select, as an output, the output connected to the lower I/O pad 394 of the memory device 312, based on the path information included in the second read request RRequest2. Thus, the DeMux 305 of the memory device 312 may receive the second read data RData2 from the page buffer 123 of the memory device 312 and output the second read data RData2 to the memory device 322 via the lower I/O pad 394 of the memory device 312 and the interconnection c1222 connected in between the lower I/O pad 394 of the memory device 312 and the upper I/O pad 396 of the memory device 322.

Further, according to at least one example embodiment of the inventive concepts, when one of the memory devices 312~38$t$ receives read data from upper I/O pad 396 or lower I/O pad 394, the memory device outputs the received read data through the first I/O pad 392.

For example, returning to the example shown in FIG. 3C, when the memory device 312 outputs the second read data RData2 through the interconnection c1222, the control logic 126 of the memory device 322 may detect that read data (e.g., the second read data RData2) has been received at the memory device 322 through one of the upper I/O pad 396 or the lower I/O pad 394, and in response to this detection, the control logic 126 of the memory device 322 may control the DeMux 305 of the memory device 322 to output the received read data through the output of the DeMux 305 that is connected to the first I/O pad 392 of the memory device 322.

Alternatively, according to at least one example embodiment of the inventive concepts, the controller 1000 may generate read requests such that the path information included in the read request identifies a particular channel of the memory system 300. Further, the control logic 126 of each memory device of the memory devices 312~38$t$ may control the memory device to generate and output a channel identifier along with read data whenever the memory device outputs read data to another memory device through one of the upper I/O pad 396 or the lower I/O pad 394. The channel identifier may be formed by the control logic 126 of the memory device based on the path information. Further, each memory device of the memory devices 312~38$t$ may store internal channel information identifying a channel to which the memory device belongs.

According to the above-referenced alternative, when one of the memory devices 312~38$t$ receives read data and a corresponding channel identifier from the upper I/O pad 396 of the memory device or the lower I/O pad 394 of the memory device, the memory device compares the received channel identifier to the internal channel information of the memory device. If the received channel identifier and the internal channel information indicate the same channel of the memory device 300, the memory device outputs the received read data through the first I/O pad 392 to a corresponding one of the communications buses 801-808. If the received channel identifier and the internal channel information of the memory device do not indicate the same channel of the memory device 300, the memory device outputs the received read data and the received channel identifier through one of the upper I/O pad 396 or the lower I/O pad 394. According to at least one example embodiment of the inventive concepts, the control logic 126 may determine which one of the upper I/O pad 396 or the lower I/O pad 394 to output the received read data through based on the received channel identifier. For example, the control logic 126 may choose a direction (i.e., up via upper I/O pad 396 or down via lower I/O pad 394) based on which direction includes the fewest steps between the channel of the memory device and the channel indicated by the channel identifier. According to the above-referenced alternative, the controller 1000 may control read data read from a memory device of a first channel of the memory device 300 (i.e., an $i^{th}$ channel) to be output through a second channel of the memory device 300 (e.g., an $(i+2)^{th}$, $(i-4)^{th}$, or $(i+6)^{th}$ channel), even when the second channel is not adjacent to (i.e., directly above or below) the first channel.

Another example structure of the memory device 900 of FIG. 1 will now be discussed in greater detail below with reference to FIGS. 4A and 4B.

Figure 4A:
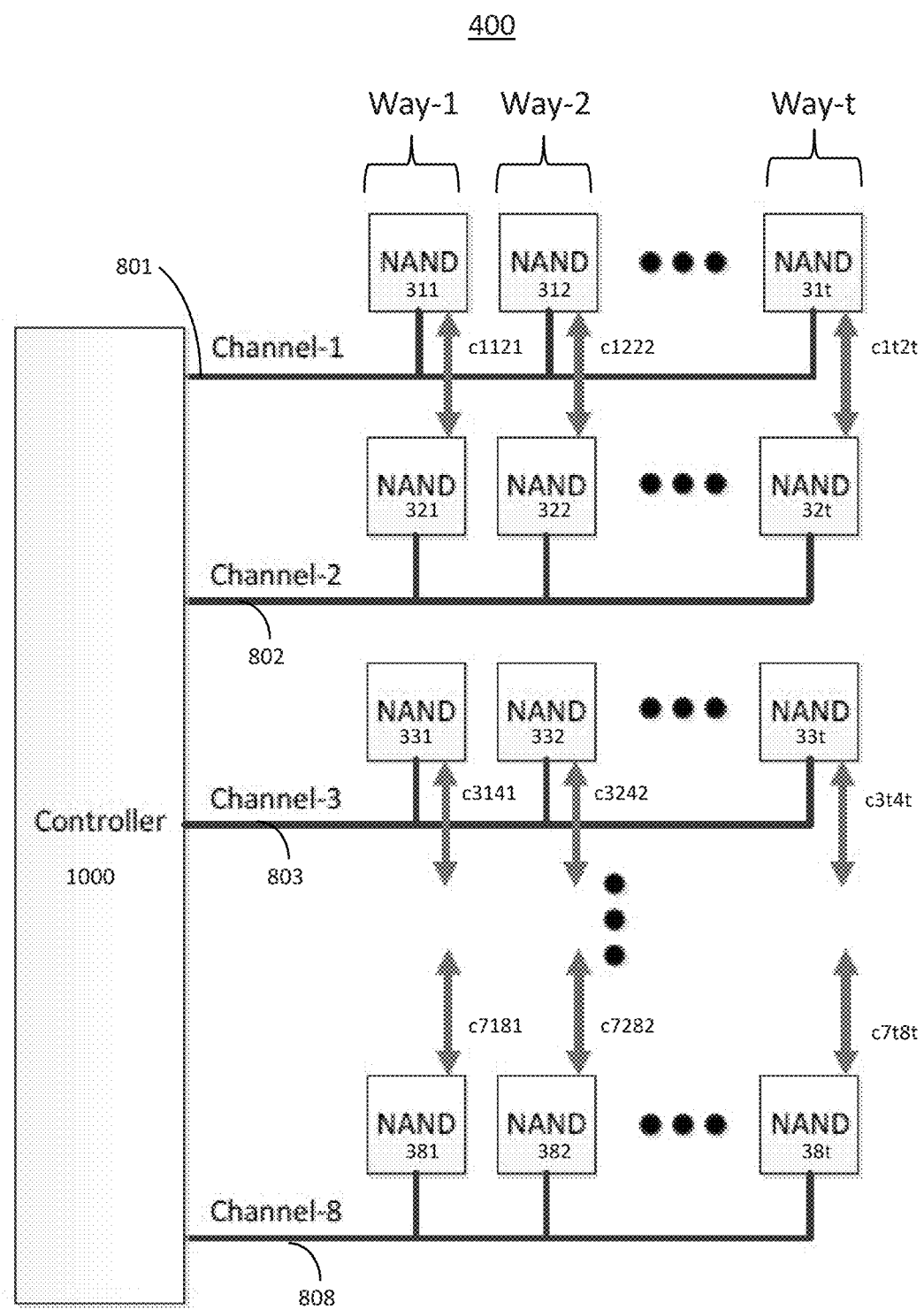
FIG. 4A is a diagram showing an example structure of the memory system of FIG. 1 employing a semi-network structure according to at least one example embodiment of the inventive concepts.

FIG. 4A is a diagram showing an example structure of the memory system of FIG. 1 employing a semi-network structure according to at least one example embodiment of the inventive concepts. FIG. 4A illustrates a memory system 400. Memory system 400 is an example implementation of the memory system 900 illustrated in FIG. 1.

As is illustrated in FIG. 4A, the memory system 400 has the same structure as the that described above with respect to the memory system 300, except that, in memory system 400, memory device of a channel Channel-i are only connected to memory devices of one other channel (i.e., Channel-(i−1) or Channel-(i+1), but not both).

Figure 4B:
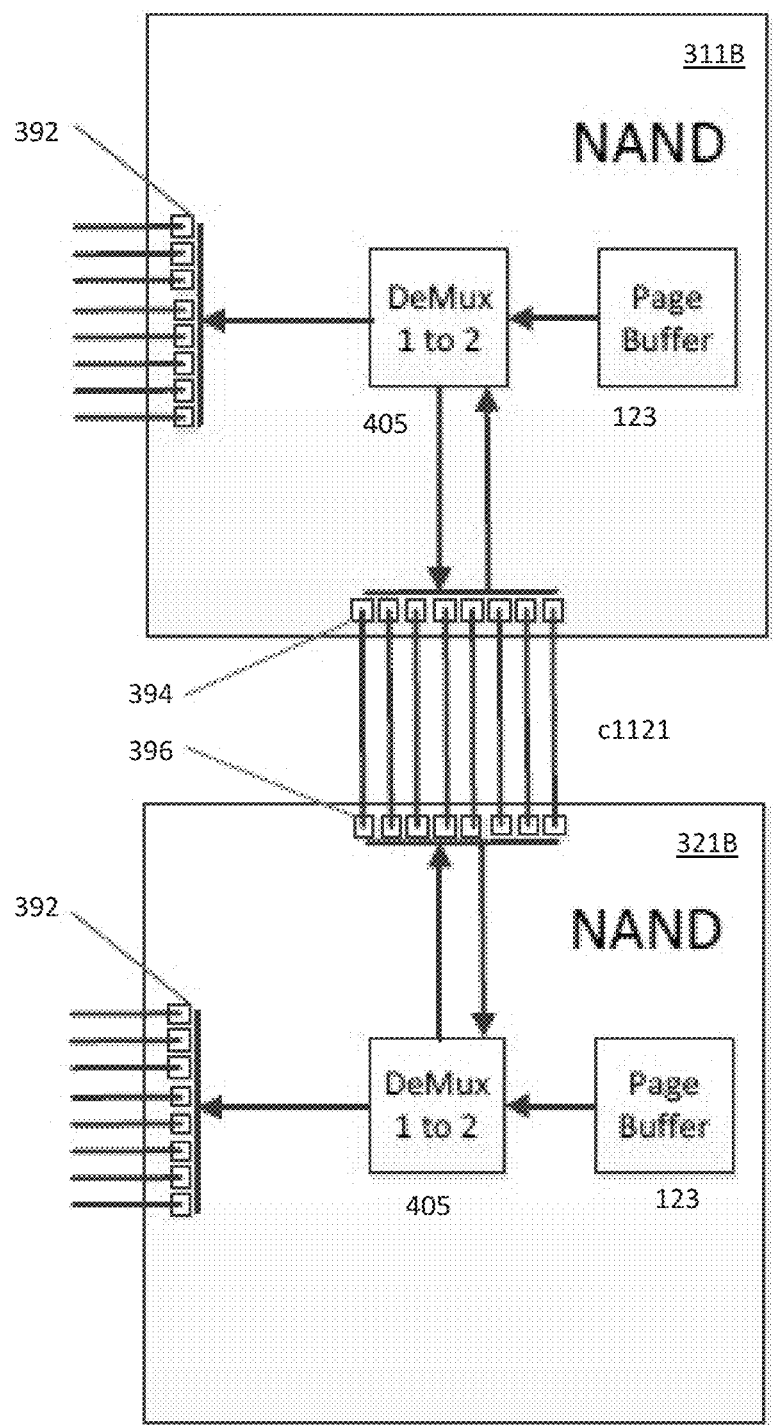
FIG. 4B is a diagram showing an example structure of a memory device of the memory system of FIG. 4A.

FIG. 4B is a diagram showing an example structure of a memory device of the memory system of FIG. 4A. FIG. 4B shows memory devices 311B and 321B, which show example structures of memory devices 311 and 321, respectively.

Memory devices 311B and 321B may both have the same structure as that described above with respect to memory device 311A illustrated in FIG. 3C, with the exceptions that memory device 311B does not include an upper I/O pad 396, the memory device 311B does not include a lower I/O pad 394, and memory devices 311A and 311B each include a 2-to-1 DeMux 405 instead of including the 1-to-3 DeMux 305 of memory device 311A.

According to at least one example embodiment of the inventive concepts, the memory devices 311B and 321B may be implemented as a separate memory chips, respectively. According to at least one example embodiment, the memory system 400 may be included in a solid state drive (SSD).

According to at least one example embodiment, when the controller 1000 of the memory system 400 determines that read requests exist for more than one memory device of a single channel, the controller 1000 can generate path information for the memory access requests such that the memory devices receiving the memory access requests output data using different channels.

For example, when the path information is included in a read request sent to the memory device 311B, the controller 1000 may generate the path information such that the path information indicates which of two paths the memory device 311B is to use in order to output the requested data. For example, the path information may indicate whether the memory device 311B should output the requested data to (i) the communication bus 801 via first I/O pad 392 or (ii) the interconnection c1121 between memory device 311 and memory device 321 via lower I/O pad 394. For example, the control logic 126 of the memory device 311B may analyze the path information received from the controller 1000, choose an output path of the DeMux 405 based on the analysis, and control the DeMux 405 of the memory device 311B to output the requested data through the chosen output.

As another example, when the path information is included in a read request sent to the memory device 321B, the memory controller 1000 may generate the path information such that the path information indicates which of two paths the memory device 321B is to use in order to output the requested data. For example, the path information may indicate whether the memory device 321B should output the requested data to (i) the communication bus 802 via first I/O pad 392 or (ii) the interconnection c1121 between memory device 311 and memory device 321 via upper I/O pad 396. For example, the control logic 126 of the memory device 321B may analyze the path information received from the controller 1000, choose an output path of the DeMux 405 based on the analysis, and control the DeMux 405 of the memory device 312B to output the requested data through the chosen output.

While, for the purpose of simplicity, only an example structure of the memory devices 311 and 321 is illustrated in FIG. 4B, all memory devices 312~38t of the memory system 400 may have the same structure shown in FIG. 4B with respect to memory device 311 or memory device 321, with the exception that the specific channels and interconnections to which memory devices 312~38t are connected via first I/O pad 392, upper I/O pad 396, and/or lower I/O pad 394 are those shown in FIG. 4A.

Compared to the memory system 300, the memory system 400 may be less expensive to implement due to, for example, including a lower number of interconnections and using demultiplexers with fewer outputs.

Though memory systems 300 and 400 are discussed above with reference to examples where the memory systems include 8 channels and t ways, the memory system 300 and 400 may each include any number of channels greater than 1 and any number of ways greater than 1.

An example algorithm that may be implemented by the controller 1000 of memory system 300 and 400 will now be discussed with reference to Algorithm 1 below.

---

Algorithm 1

---

Input: {Q - instructions queue, $n_{ch}$ - number of channels, $q_n$ - size of Q}
(A1) If exist a subset of Q at size $n_{ch}$ such that different instructions address different channels:
   (A1.1) Allocate read instructions subset to channels
Else
   (A1.2) Choose subset of Q at size $n_{ch}$ such that maximum Instructions are with idle channel
   (A1.3) In the remaining instructions of (A1.2) with busy channels, route to idle channels via Y-direction.
(A2) Q ← Q − $n_{ch}$
(A3) Return to (A1) while $q_n > 0$

---

Referring to Algorithm 1, initially the controller 1000 may receive, as input, instructions that are stored in an instruction queue Q (e.g., in the RAM 112 of the controller 1000). The instruction queue Q may have a total number of instructions $q_n$. Algorithm 1 applies to a scenario in which $q_n$ is greater than or equal to $n_{ch}$, which is the total number of channels in the memory system 300 (or 400). Algorithm 1 will be explained with reference to an example where the instructions included in the instruction queue Q are read requests each addressed to a memory device on one of the $n_{ch}$ channels of the memory system 300 (or 400).

Referring to Algorithm 1, in Step (A1), the controller determines whether or not the instruction queue Q includes a first subset of instructions, where the first subset of instruction is defined as a subset of size $n_{ch}$ for which each instruction of the subset is addressed to a different one of the $n_{ch}$ channels.

When the controller 1000 determines, in step (A1), that the first subset exists, the controller 1000 proceeds to step (A1.1). In step (A1.1), the memory controller 1000 sends the $n_{ch}$ read requests of the first subset to memory devices of each of the $n_{ch}$ channels such that, for each one of the $n_{ch}$ channels, the channel is used to output read data from a memory device of the channel. Accordingly, each of the $n_{ch}$ channels may output read data in parallel, and thus, channel utilization is 100%. However, sometimes, such a first subset does not exist in instruction queue Q.

When the controller 1000 determines, in step (A1), that the first subset does not exist within the instruction queue Q, the controller 1000 proceeds to step (A1.2). In step (A1.2), the controller 1000 chooses a second subset of instructions. The second subset includes at least two instructions assigned to the same channel.

According to at least one example embodiment, the second subset is defined as a subset of size $n_{ch}$ of the instructions included in the instruction queue Q that does not include a instructions addressed to each one of the $n_{ch}$ channels.

Alternatively, the second subset is defined as the subset of size $n_{ch}$ of the instructions included in the instruction queue Q that maximizes a number of idle channels, from among the $n_{ch}$ channels, to which at least one instruction of the subset is addressed (i.e., minimizes a number of idle channels to which no instructions of the subset are addressed).

In step (A1.2) the controller 1000 assigns one instruction from the second subset to every one of the $n_{ch}$ channels to which at least one of the instructions in the second subset is addressed, and the channels to which the instructions of the second subset are assigned become busy by outputting read data in response to the instructions.

Because, as is discussed above, the second subset includes at least two instructions addressed to the same channel, after step (A1.2) there will be one or more waiting instructions, where waiting instructions are defined as instructions that are included in the second subset and are addressed to already-busy channels. Accordingly, in step (A1.3) the controller 1000 routes the waiting instructions to idle channels among the $n_{ch}$ channels, for example, using the path information discussed above with reference to FIGS. 3A-4B. Read data may be output, in response to the waiting instructions, using the interconnections of the semi-network structure discussed above with reference to FIGS. 3A-4B. Accordingly, channel utilization may still reach, or alternatively, rise towards 100% even when the first subset does not exist.

In step (A2), because the instructions of the first subset or the second subset have been assigned to a channel, the controller 1000 may remove the $n_{ch}$ instructions of the first subset or the second subset from the instruction queue Q.

In step (A3), the controller 1000 returns to step (A1) while the current $q_n$ is greater than 0. If $q_n$ becomes 0, the controller 1000 may end Algorithm 1 until $q_n$ is not 0.

While Algorithm 1 is described above with reference to a scenario in which $q_n$ is greater than or equal to $n_{ch}$, which is the total number of channels in the memory system 300 (or 400). A modified version of Algorithm 1 may be used when $q_n$ is less than $n_{ch}$. In the modified version of Algorithm 1 is modified as follows: the first and second subsets formed in steps (A1) and (A1.2) may each include a number of instructions smaller than $q_n$. According to at least one example embodiment, in the modified version of Algorithm 1, the first and second subsets formed in steps (A1) and (A1.2) each include a number of instructions equal to a total number of instructions in the instruction queue Q.

Figure 5:
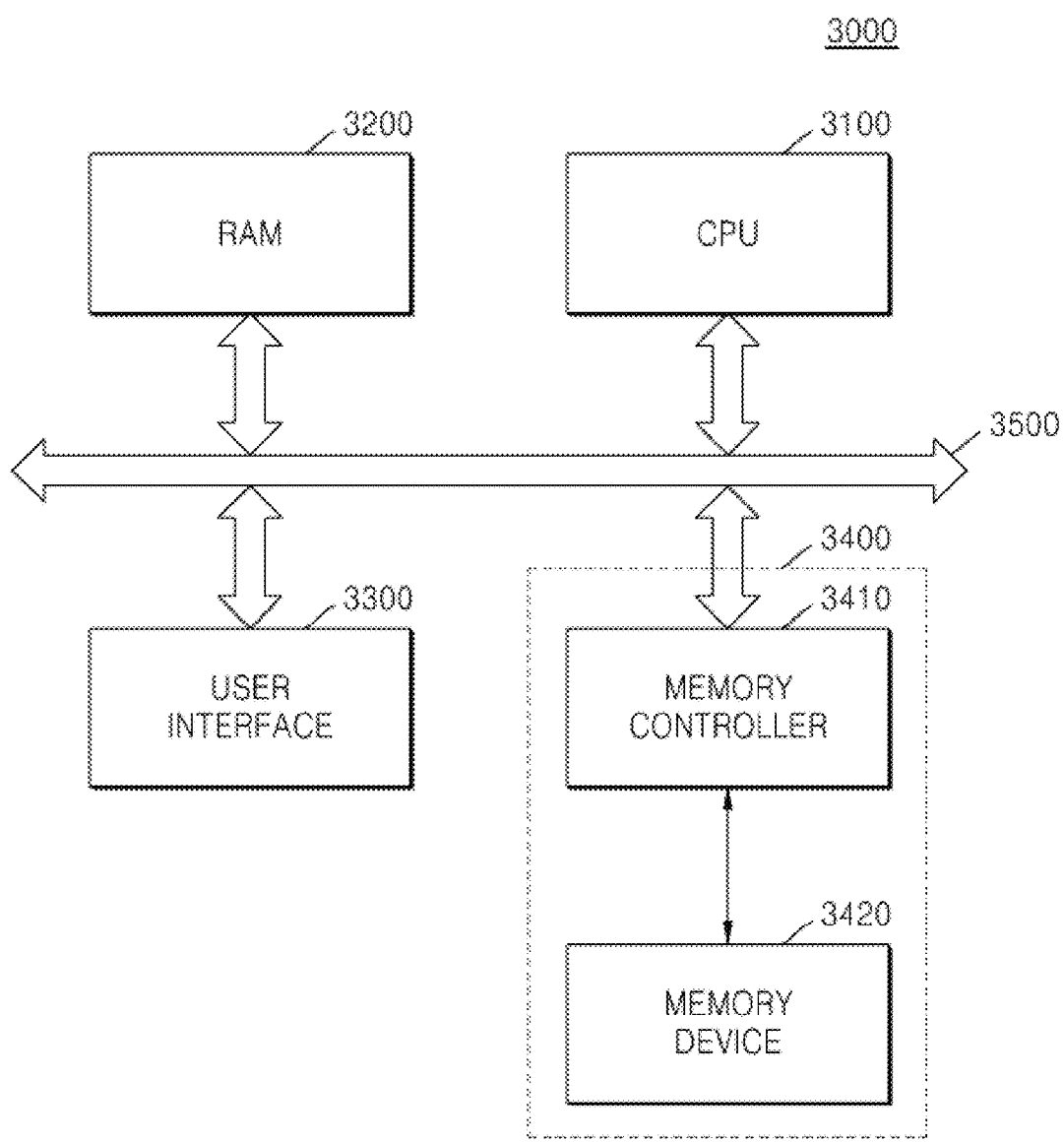
FIG. 5 is a block diagram showing a computer system including a memory system according to example embodiments of inventive concepts.

FIG. 5 is a block diagram showing a computer system 3000 including a memory system according to at least one example embodiment of the inventive concepts. The computer system 3000, such as a mobile device, a desktop computer, and a server, may employ a memory system 3400 according to at least one example embodiment of the inventive concepts.

The computer system 3000 may include a central processing unit 3100, a RAM 3200, a user interface 3300, and the memory system 3400, are electrically connected to buses 3500. The host as described above may include the central processing unit 3100, the RAM 3200, and the user interface 3300 in the computer system 3000. The central processing unit 3100 may control the entire computer system 3000 and may perform calculations corresponding to user commands input via the user interface 3300. The RAM 3200 may function as a data memory for the central processing unit 3100, and the central processing unit 3100 may write/read data to/from the memory system 3400.

As in example embodiments of inventive concepts described above, the memory system 3400 may include a memory controller 3410 and a memory device 3420. The memory controller 3410 may include an encoder and a decoder, and the memory device 3420 may include a cell array including a plurality of memory cells.

According to at least one example embodiment of the inventive concepts, the memory controller 3410 may be implemented by the memory controller 1000 discussed above with reference to FIGS. 1-4B and the memory device 3420 may be implemented by the memory devices 311~38*t* discussed above with reference to FIGS. 1-4B.

Figure 6:
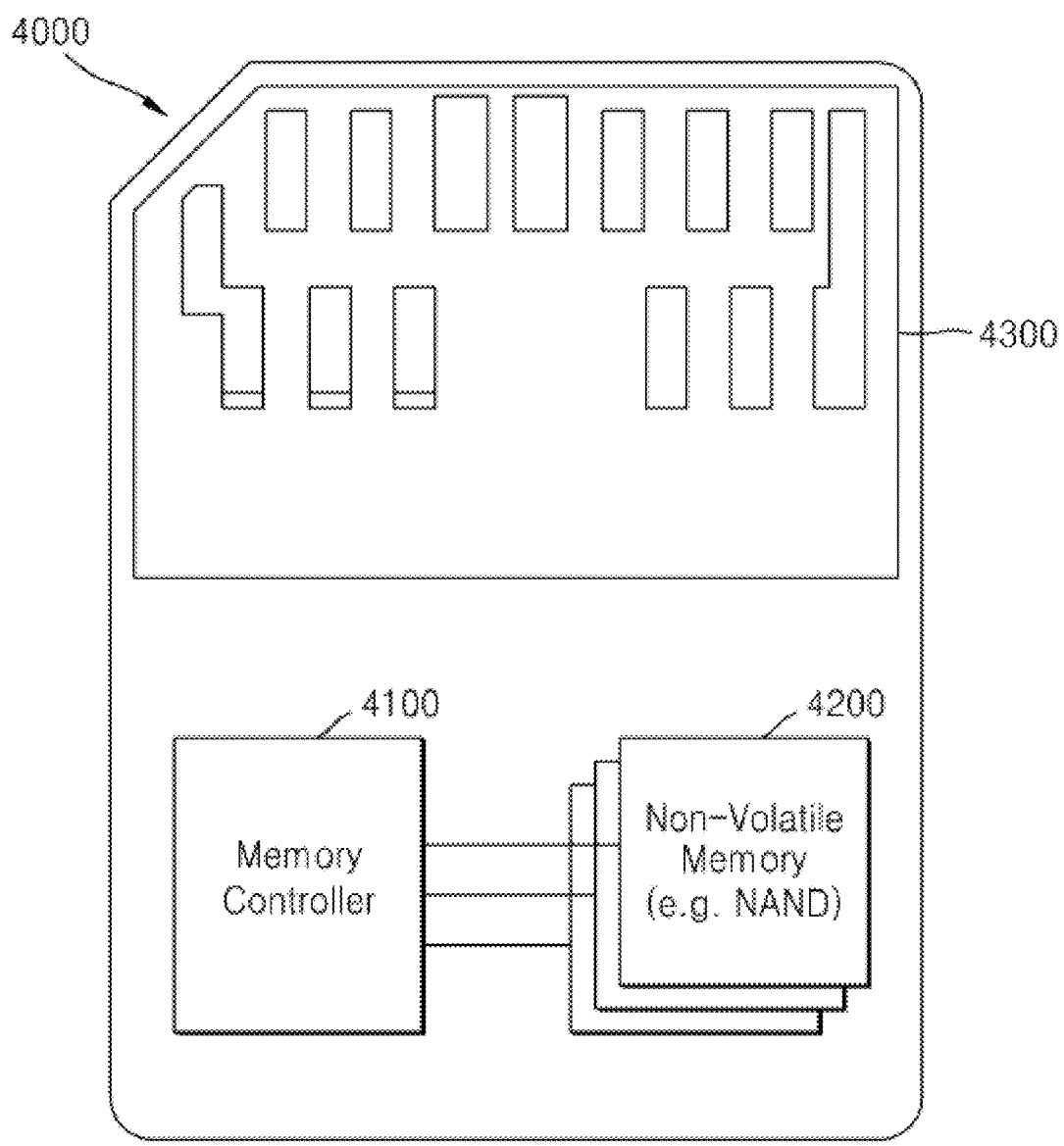
FIG. 6 is a block diagram showing a memory card according to at least one example embodiment of the inventive concepts.

FIG. 6 is a block diagram showing a memory card 4000 according to at least one example embodiment of the inventive concepts. A memory system 900, 300 or 400 according to example embodiments of inventive concepts discussed above with reference to FIGS. 1-4B may be the memory card 4000. For example, the memory card 4000 may include an embedded multimedia card (eMMC) or a secure digital (SD) card. As shown in FIG. 6, the memory card 4000 may include a memory controller 4100, a non-volatile memory 4200, and a port region 4300. The memory controller 4100 may be implemented by the controller 1000 discussed above with reference to FIGS. 1-4B, and the non-volatile memory 4200 shown in FIG. 6 may be implemented by the memory devices 311~38*t* discussed above with reference to FIGS. 1-4B.

The memory controller 4100 may include an encoder and a decoder. The encoder and the decoder may perform an encoding method and a decoding method according to example embodiments of inventive concepts. The memory controller 4100 may communicate with an external host via the port region 4300 in compliance with a pre-set protocol. The protocol may be eMMC protocol, SD protocol, SATA protocol, SAS protocol, or USB protocol. The non-volatile memory 4200 may include memory cells which retain data stored therein even if power supplied thereto is blocked. For example, the non-volatile memory 4200 may include a flash memory, a magnetic random access memory (MRAM), a resistance RAM (RRAM), a ferroelectric RAM (FRAM), or a phase change memory (PCM).

According to at least one example embodiment of the inventive concepts, the memory controller 4100 and a memory device 4200 may be implemented, respectively, by the memory controller 1000 and a memory device 2000 discussed above with reference to FIGS. 1-10C.

Figure 7:
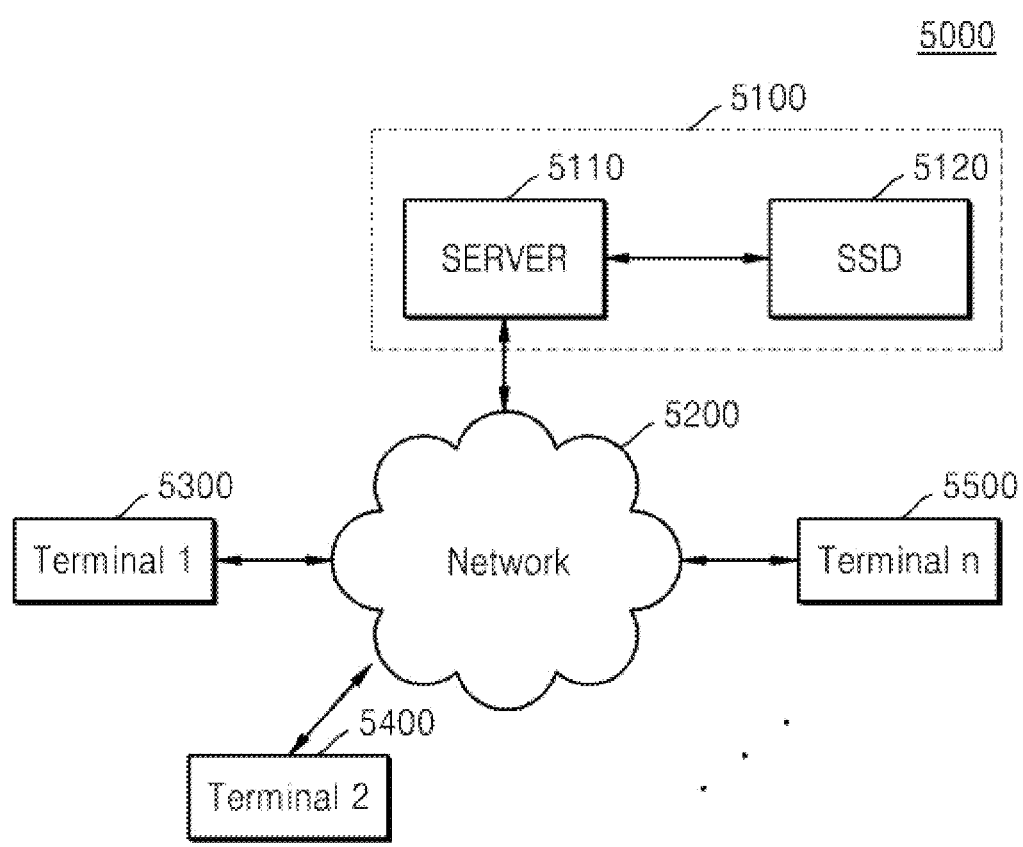
FIG. 7 is a block diagram showing an example network system including a memory system according to at least one example embodiment of the inventive concepts.

FIG. 7 is a block diagram showing an example network system 5000 including a memory system according to at least one example embodiment of the inventive concepts. As shown in FIG. 7, the network system 5000 may include a server system 5100 and a plurality of terminals 5300, 5400, and 5500 that are connected via a network 5200. The server system 5100 may include a server 5110 for processing requests received from the plurality of terminals 5300, 5400, and 5500 connected to the network 5200 and a SSD 5120 for storing data corresponding to the requests received from the terminals 5300, 5400, and 5500. Here, the SSD 5120 may be a memory system according to at least one example embodiment of the inventive concepts.

According to at least one example embodiment of the inventive concepts, SSD 5120 may be implemented by the memory system 900, 300 or 400 discussed above with reference to FIGS. 1-4B.

Meanwhile, a memory system according to example embodiments of inventive concepts may be mounted via any of various packages. For example, a memory system according to at least one example embodiment of the inventive concepts may be mounted via any of packages including package on package (PoP), ball grid arrays (BGAs), chip scale packages (CSPs), plastic leaded chip Carrier (PLCC), plastic dual in-line package (PDIP), die in waffle pack, die in wafer form, chip on board (COB), ceramic dual in-line package (CERDIP), plastic metricquad flat pack (MQFP), thin quad flatpack (TQFP), small outline (SOIC), shrink small outline package (SSOP), thin small outline (TSOP), thin quad flatpack (TQFP), system in package (SIP), multi chip package (MCP), wafer-level fabricated package (WFP), wafer-level processed stack package (WSP), etc.

It should be understood that example embodiments described herein should be considered in a descriptive sense only and not for purposes of limitation. Descriptions of features or aspects within each embodiment should typically be considered as available for other similar features or aspects in other example embodiments.

What is claimed is:

1. A memory system comprising:
a first plurality of nonvolatile memory devices of a first channel of the memory system, the first plurality of nonvolatile memory devices each being connected to a first communications bus;
a second plurality of nonvolatile memory devices of a second channel of the memory system, the second plurality of nonvolatile memory devices each being connected to a second communications bus; and
a first interconnection between a first memory device and a second memory device,
the first memory device being a memory device from among the first plurality of nonvolatile memory devices,
the second memory device being a memory device from among the second plurality of nonvolatile memory devices,
wherein the first memory device comprises:
a control logic;
a memory cell array;
a page buffer; and
a demultiplexer, the demultiplexer being configured to,
receive data from the page buffer,
receive data from the first interconnection, and
select, based on a control signal received from the control logic, between,
outputting data to the second memory device through the first interconnection, and
outputting data to the first communications bus.

2. The memory system of claim 1, wherein the first memory device is configured to,
receive, from a controller, a first read request that requests first read data, and
to select, based on path information included in the first read request, between,
outputting the first read data to the first communications bus, and
outputting the first read data to the first interconnection.

3. The memory system of claim 1 wherein,
the first memory device includes a lower input/output (I/O) pad through which the first memory device is connected to the first interconnection, and
the second memory device includes an upper I/O pad through which the second memory device is connected to the first interconnection.

4. The memory system of claim 3 wherein,
the first plurality of nonvolatile memory devices include a first plurality of separate memory cell arrays, respectively, and
the second plurality of nonvolatile memory devices include a second plurality of separate memory cell arrays, respectively.

5. The memory system of claim 1 wherein,
the first plurality of nonvolatile memory devices include first channel input/output (I/O) pads, respectively, through which the first plurality of nonvolatile memory devices are connected to the first communications bus, and
the second plurality of nonvolatile memory devices include second channel input/output (I/O) pads, respectively, through which the second plurality of nonvolatile memory devices are connected to the second communications bus.

6. The memory system of claim 5 wherein,
the first memory device includes a lower input/output I/O pad through which the first memory device is connected to the first interconnection, and
the second memory device includes an upper I/O pad through which the first memory device is connected to the first interconnection.

7. The memory system of claim 5 wherein,
the first plurality of nonvolatile memory devices include a first plurality of separate memory cell arrays, respectively, and
the second plurality of nonvolatile memory devices include a second plurality of separate memory cell arrays, respectively.

8. The memory system of claim 1 further comprising:
a third plurality of nonvolatile memory devices of a third channel, the third plurality of nonvolatile memory devices each being connected to a third communications bus; and
a second interconnection between the first memory device and a third memory device,
the third memory device being a memory device from among the third plurality of nonvolatile memory devices.

9. The memory system of claim 8, wherein the first memory device is configured to,
receive, from a controller, a first read request that requests first read data, and
to select, based on path information included in the first read request, between,
outputting the first read data to the first communications bus,
outputting the first read data to the second memory device via the first interconnection, and
outputting the first read data to the third memory device via the second interconnection.

10. The memory system of claim 8, wherein the first memory device comprises:
a control logic;
a memory cell array;
a page buffer; and
a demultiplexer, the demultiplexer being configured to,
further receive data from the third memory device via the second interconnection, and
to select, based on the control signal received from the control logic, between
outputting data to the first communications bus,
outputting data to the second memory device via the first interconnection, and
outputting data to the third memory device via the second interconnection.

11. The memory system of claim 8 wherein,
the first memory device includes a lower input/output (I/O) pad through which the first memory device is connected to the first interconnection,
the second memory device includes an upper I/O pad through which the second memory device is connected to the first interconnection,
the first memory device includes an upper I/O pad through which the first memory device is connected to the second interconnection, and
the third memory device includes a lower I/O pad through which the third memory device is connected to the second interconnection.

12. A memory system including a plurality of channels, the memory system comprising:
a controller; and
a plurality of nonvolatile memory devices,
each of the plurality of nonvolatile memory devices being assigned to one of the plurality of channels,
the plurality of channels corresponding, respectively, to a plurality of communications buses such that, for each of one the plurality of channels, nonvolatile memory devices assigned to the channel, from among the plurality of nonvolatile memory devices, are connected to the controller via the communications bus corresponding to the channel,
the controller being configured to generate a read request requesting first data from a first memory device such that the read request includes path information instructing the first memory device to output the first data to a second memory device,
the first memory device and the second memory device being ones of the plurality of nonvolatile memory devices,
the first memory device and the second memory device being assigned to different channels respectively, from among the plurality of channels,
the memory system further comprising a first interconnection between the first memory device and the second memory device,
wherein the first memory device comprises:
a control logic;
a memory cell array;
a page buffer; and
a demultiplexer, the demultiplexer being configured to,
receive data from the page buffer,
receive data from the first interconnection, and
select, based on a control signal received from the control logic, between,
outputting data to the second memory device through the first interconnection, and
outputting data to the controller through a first communications bus,
the first communications bus being the communication bus, from among the plurality of communications buses, corresponding to the channel, from among the plurality of channels, to which the first memory device is assigned.

13. The memory system of claim 12 wherein,
the first memory device includes a lower input/output (I/O) pad through which the first memory device is connected to the first interconnection, and
the second memory device includes an upper I/O pad through which the second memory device is connected to the first interconnection.

14. The memory system of claim 12, wherein the first memory device is configured to,
receive the read request, and
output the first data to the second memory device through the first interconnection, in response to the path information.

15. The memory system of claim 12, further comprising:
a second interconnection between the first memory device and a third memory device,
the third memory device being one of the plurality of nonvolatile memory devices,
the first, second and third memory devices being assigned, respectively, to different channels from among the plurality of channels.

16. The memory system of claim 15, the demultiplexer being configured to,
further receive data from the second interconnection, and
to select, based on the control signal received from the control logic, between,
outputting data to the second memory device through the first interconnection,
outputting data to the third memory device through the second interconnection, and
outputting data to the controller through a first communications bus,
the first communications bus being the communication bus, from among the plurality of communications buses, corresponding to the channel, from among the plurality of channels, to which the first memory device is assigned.

17. The memory system of claim 15 wherein,
the first memory device includes a lower input/output (I/O) pad through which the first memory device is connected to the first interconnection,
the second memory device includes an upper I/O pad through which the second memory device is connected to the first interconnection,
the first memory device includes an upper I/O pad through which the first memory device is connected to the second interconnection, and the third memory device includes a lower I/O pad through which the third memory device is connected to the second interconnection.

* * * * *